March 31, 1970     O. R. SCHAPER     3,503,449
ANTI-CLOGGING ATTACHMENT FOR MOLDBOARD PLOWS
Filed Jan. 5, 1968     2 Sheets-Sheet 1
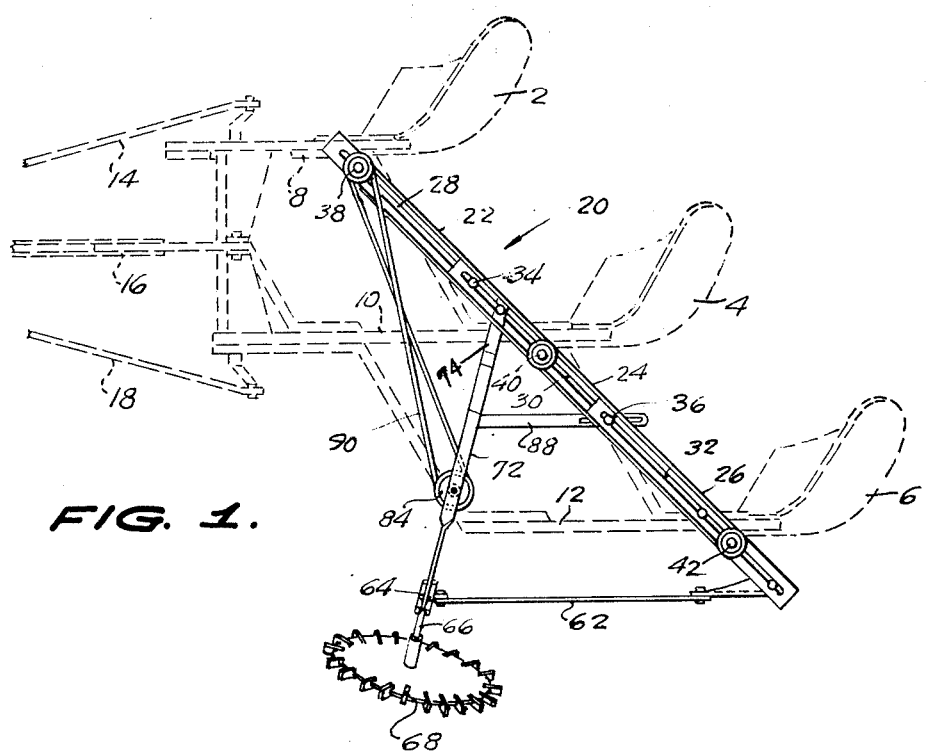
FIG. 1.
FIG. 2.
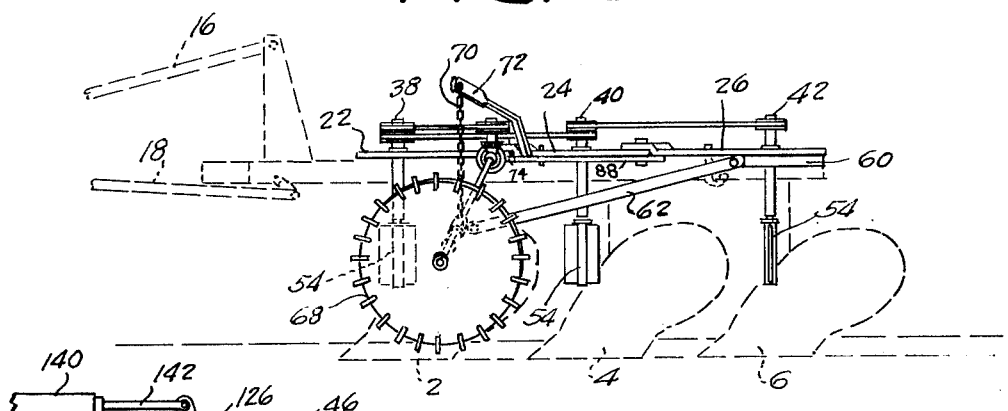
FIG. 6.
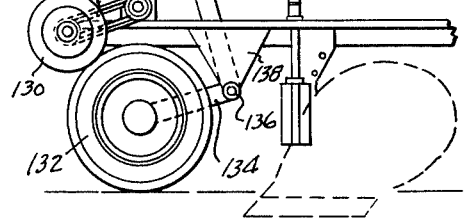
INVENTOR.
OTTO R. SCHAPER,
BY
*Berman, Davidson & Berman*
ATTORNEYS.

March 31, 1970 O. R. SCHAPER 3,503,449
ANTI-CLOGGING ATTACHMENT FOR MOLDBOARD PLOWS
Filed Jan. 5, 1968 2 Sheets-Sheet 2
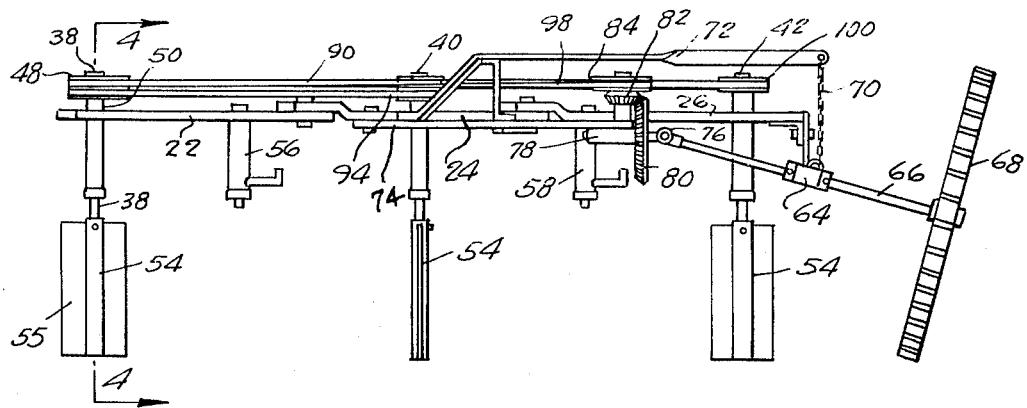
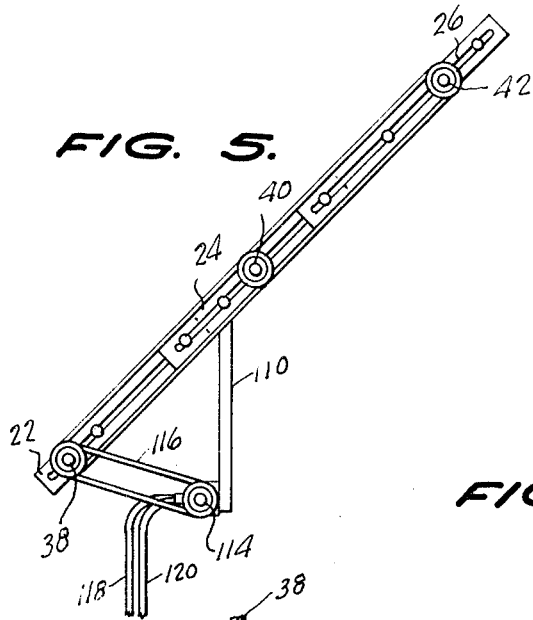
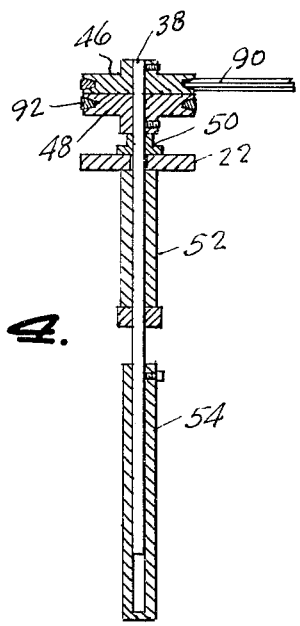
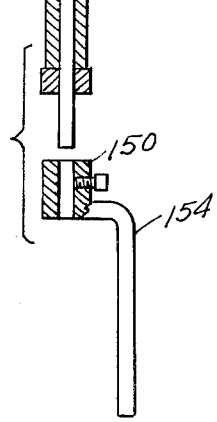
INVENTOR.
OTTO R. SCHAPER,
BY
Berman, Davidson & Berman
ATTORNEYS.

United States Patent Office 3,503,449
Patented Mar. 31, 1970

3,503,449
ANTI-CLOGGING ATTACHMENT FOR
MOLDBOARD PLOWS
Otto R. Schaper, Estherville, Iowa 51334
Filed Jan. 5, 1968, Ser. No. 696,007
Int. Cl. A01b 9/00
U.S. Cl. 172—39                                     5 Claims

ABSTRACT OF THE DISCLOSURE

Anti-clogging attachment for moldboard plows, said attachment comprising: a frame; paddle members journaled in said frame for rotation about vertical axes; clamping means for attaching said frame to moldboard plows and means to rotate said paddle members.

---

This invention relates to an anti-clogging attachment, for use with conventional moldboard plows, particularly of the gang type where two or more plows are operated as a unit.

The development of machine harvesting for corn and cotton has given rise to certain problems when, after the crop is in, the field must be plowed and refitted for the next year's crop. Machine harvesting of the aforesaid crops leaves the above ground plant structures substantially intact, since only the ears of corn and the bolls of cotton are removed by the machine. When a field of corn or cotton has been harvested, the above ground plant structures remaining have a great tendency to clog the plow, particularly when two or more plows are operated as a gang. In this case, the above ground plant structures are difficult to bury by means of the plows and there is a distinct tendency for these structures to merge with the dirt loosened by the plows and form into compact masses between any two plowshares. Once such a mass starts to form, it very easily can accumulate and concentrate into a hard-packed mass of dirt and stalks which is highly resistant to any manual efforts to clear the space between plows and which, if it accumulates sufficiently, will lift the plows out of the ground and render them ineffective. The manual labor involved in clearing such a mass, once it is formed, is considerable and time-consuming and, moreover, leaves in the path of the plows, a very considerable pile of dirt and plant debris, which is a serious obstacle to subsequent cultivation as by disking, spring-toothing, etc.

It is an object of this invention to provide an attachment for gang plows which will be highly adaptable to variable plow spacing, will be cheap and simple to manufacture, and which will operate to forestall any accumulation of trash and dirt between the plows and, as an incidental advantage, serves to improve the complete burial of plant debris by the freshly overturned earth, a feature which is enormously advantageous to the proper fitting of a field for the planting of the next crop.

The above and other objects will be made clear from the following detailed description taken in connection with the annexed drawings, in which:

FIGURE 1 is a plan view of a three-plow gang with the improved attachment in place;

FIGURE 2 is a side elevation of the structure shown in FIGURE 1;

FIGURE 3 is an elevation of the attachment per se, taken substantially normal to the axis of the drag wheel shown at the bottom of FIGURE 1;

FIGURE 4 is a section taken on the line 4—4 of FIGURE 3;

FIGURE 5 is a plan view showing an alternative drive system for the paddles;

FIGURE 6 is an elevational view showing still another alternative drive means for the anti-clogging device; and FIGURE 7 is a side elevation, partly in section of an alternative form of paddle.

In FIGURE 1, there are shown in dotted outlines conventional plowshares 2, 4 and 6 secured to conventional frame members 8, 10 and 12 which meet in the conventional three-point hitch consisting of members 14, 16 and 18. The attachment of this invention is generally designated 20 and comprises a series of individual frame members 22, 24 and 26.

The member 22 has a central longitudinal slot 28; the member 24 has a similar slot 30 while the member 26 has a similar slot 32. The slots 28, 30 and 32 serve a dual purpose. As shown in FIGURE 1, the members 22 and 24 overlap as do the slots 28 and 30, and the members 22 and 24 are secured together by a bolt 34 passing through the superimposed slots. Similarly, the members 24 and 26 overlap as do the slots 30 and 32 and are held together by a bolt 36. It will be seen at once that the resultant structure is extensible and contractible to accommodate various spacings which may occur between the plowshares 2, 4 and 6.

The slot 28 and the member 22 also serve as an adjustable support for a vertical shaft 38. The slots 30 and the member 24 also serves as an adjustable mounting for a similar shaft 40 while the slot 32 and the member 26 serve adjustably to mount a third shaft 42. On the first shaft 38 are mounted a pair of pulleys 46 and 48. Bearing members 50 and 52 surround shaft 38 and are supported rotatably by the member 22. Below the member 22 the shaft 38 carries a paddle member 54 which is shown as carrying blades 55 and which could carry three, four or more blades as desired.

Secured to the member 22 and mounted in the slot 28 is a clamping member 56. A similar clamping member 58 is similarly secured to the member 26 and these clamps 56 and 58 serve to secure the frame of the attachment to suitable framing portions of the plows.

Secured to the extreme right end of the member 26 is a bracket 60 and to this is pivoted a link 62 having its opposite end pivoted to a bearing member 64 through which passes a shaft 66. A drag wheel 68 is secured to the free end of the shaft 66 and, when the plows are in active position, wheel 68 engages the ground, thus rotating the shaft 66 as the plows progress forward and thereby operating the paddle members 54 in a manner presently to be described. Also secured to the bearing member 64 is a chain 70 secured at its opposite end to a supporting arm 72 which in turn is secured by means of a bracket 74 to the frame member 24.

The opposite end of the shaft 66 engages a universal joint 76 through which it drives a stub shaft 78 carrying a beveled gear 80. The gear 80 meshes with a beveled pinion 82 on the same shaft with a pulley 84. The bevel gears 80 and 82 and the pulley 84 are supported on an arm 86 which in FIGURE 1 directly underlies the arm 72 and is supported by an adjustable bracing arm 88, best seen in FIGURE 1.

The pulley 84 through a belt 90 drives the pulley 46 on the shaft 38 while the pulley 48, also on shaft 38, through a belt 92, drives a pulley 94 mounted on shaft 40. A second pulley 96 also mounted on shaft 40 through a belt 98 drives a pulley 100 on the shaft 42. This drive results in rotation of all three of the paddle members 54 about their respective vertical axes.

It is to be noted particularly in FIGURE 1 that the direction of rotation of the paddles 54 may be controlled by crossing or running direct the belt 90, as best seen in FIGURE 1 and, as shown in FIGURES 1 and 2, the paddle members 54 are located just behind the plow points slightly to the left of the forward path of the plow points and slightly above the lower depth of penetration of the plow points. Since the paddles will be rotating rapidly as the plows advance, given the location just described, it is quite impossible to bulid up any accumulation of trash between the plows and it is between the plows that such accumulations are most likely to occur.

FIGURE 4 details the arrangement of pulleys and paddles on shaft 38 and the arrangement is similar for the shafts 40 and 42.

FIGURE 5 illustrates an alternative form of drive. In this case, the members 22, 24 and 26 and the shafts 38, 40 and 42 retain their previous numbering. A special arm 110 connected to member 24 at 112 supports a hydraulic motor 114 which through a belt 116 drives the pulley 46. A hydraulic pump on the tractor powers the motor 114 through lines 118 and 120, otherwise the attachment operates precisely as described with reference to FIGURES 1–4.

In FIGURE 6, a member 22', corresponding to member 22 in FIGURES 1–4, has a forwardly projecting elongated portion on which is mounted a gear box 122 driving a pulley 124 which through a belt 126 drives a pulley 46 corresponding to the pulley 46 of FIGURE 4 and with the remaining parts much the same as in FIGURES 1–4. An arm 128 is pivoted to the gear box 122 and supports at its free end a friction roller 130. The friction roller 130 rests on a depth control roller 132 rotatably mounted in a bell crank 134 which is pivoted at 136 to a bracket 138 secured to the member 22'. Plowing depth is controlled by a cylinder 140 which through a piston 142 and rod 144 rotates the bell crank 134 about the pivot 136. Since there is frictional bearing between the wheels 130 and 132, so long as the plows are active and the roll 132 is in contact with the ground, the wheel 130 will be rotated and will drive the belt 126, as indicated.

FIGURE 7 shows a form of paddle which, for certain kinds of trash, operates advantageously. Here the shaft 38 emerges from bearing member 52 and enters a hub 150 where it is secured by a set screw 152. An arm 154 is secured to the hub 150 and extends downwardly spaced from but parallel to the shaft 38. The arm 154 rotates about the axis of the shaft 38 and is highly effective on certain kinds of trash.

While certain details of construction have been disclosed herein, numerous alterations in such details doubtless will occur to those skilled in the art. It is not, therefore, intended to limit this invention to the precise details disclosed but only as set forth in the subjoined claims.

What is claimed is:

1. An anti-clogging attachment for moldboard plows, comprising a frame, said frame having a plurality of individual frame members with longitudinal slots therein, said frame members and slots overlapping each other with bolt means extending through said overlapping slot portions and detachably securing said frame members together to provide a varying number of frame members connected together and longitudinal adjustment thereof to accommodate the spacing of the plows, clamping means on said frame for detachably connecting said frame to moldboard plows above the forward end of said plow, vertically disposed rotatable paddle members mounted in the longitudinal slots of said frame members, said members extending downwardly to a point adjacent the forward end of a plow and means on said plow frame for driving said paddle members.

2. Attachment as set forth in claim 1, in which all paddle members rotate in the same direction and means for reversing said direction.

3. Attachment as set forth in claim 1, in which said paddle members have drive belts running from one to the next and one of said paddle members is driven from a drag wheel.

4. Attachment as set forth in claim 1, in which said paddle members have drive belts running from one to the next and one of said paddle members is driven from a hydraulic motor.

5. Attachment as set forth in claim 1, in which said paddle members have drive belts running from one to the next and one of said paddle members is driven from a friction wheel driven from a depth regulator wheel attached to said plows.

References Cited

UNITED STATES PATENTS

| | | | |
|---|---|---|---|
| 417,930 | 12/1889 | Metz | 172—39 |
| 2,877,857 | 3/1959 | Baasen | 172—66 X |
| 2,920,706 | 1/1960 | Turner | 172—106 X |
| 3,115,940 | 12/1963 | Heinrich | 172—106 X |
| 3,152,648 | 10/1964 | Wildt et al. | 172—609 |
| 3,321,025 | 5/1967 | Ellefson et al. | 172—39 |
| 1,720,490 | 7/1929 | Koller | 172—741 X |

ROBERT E. BAGWILL, Primary Examiner

S. C. PELLEGRINO, Assistant Examiner

U.S. Cl. X.R.

172—66, 106, 741